Figure 1:
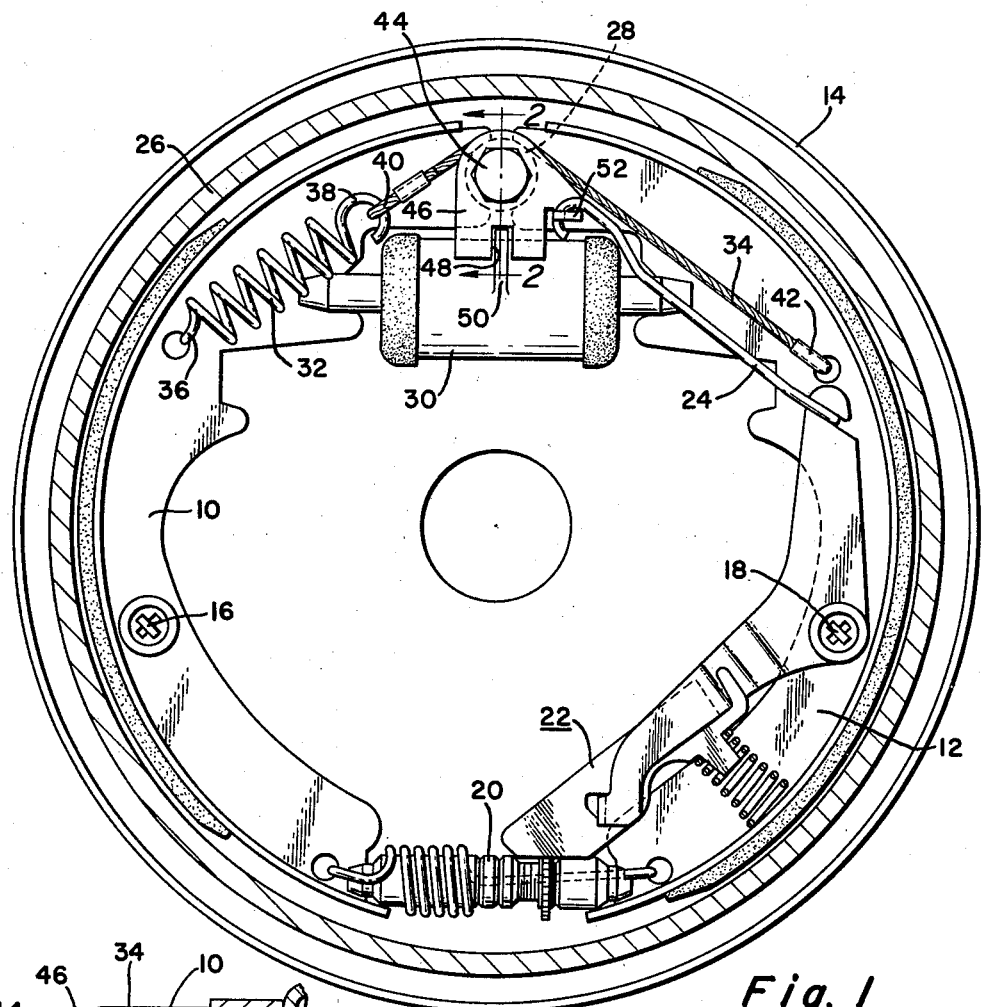

July 13, 1965

L. L. RICHARDS 3,194,359

BRAKE SHOE RETRACTING MECHANISM

Filed March 6, 1963

INVENTOR.
Larry L. Richards
BY
His Attorney

United States Patent Office 3,194,359
Patented July 13, 1965

3,194,359
BRAKE SHOE RETRACTING MECHANISM
Larry L. Richards, South Lyon, Mich., assignor to General Motors Corporation, Detroit, Mich., a corporation of Delaware
Filed Mar. 6, 1963, Ser. No. 263,221
7 Claims. (Cl. 188—216)

The invention relates to a brake mechanism particularly for use in automotive vehicles. Features of the invention include the provision of a novel retracting mechanism and mounting for the automatic adjustment linkage for the brake. The invention is disclosed in the drawings as being attached to a duo-servo type brake, but may be used with other types of brakes wherein two shoes are required to be retracted.

In carrying out the invention the retracting mechanism is made of a single retracting spring and a flexible cable, with the single retracting spring being secured to one of the shoes and the flexible cable being secured to the spring and passing over the anchor pin after it is connected to the other shoe. This eliminates the provision of the usual secondary retracting spring as well as the necessity for a retracting spring bracket. The bracket is replaced by an anchor bolt lock plate to which may be attached the automatic adjuster actuating lever link. This construction, by eliminating the secondary retracting spring, eliminates one variable found in assemblies which have two retracting springs, one for each shoe. It also brings the anchor point of the retracting force closer to the center line of the shoe. By attaching the spring to the primary shoe, the spring is located adjacent the shoe doing the lesser work under normal forward stopping conditions and therefore is not subjected to as much heat as the spring adjacent the secondary shoe. This construction also assures that the primary shoe will leave the anchor pin first on all forward stops, since this shoe has to overcome only the primary spring load while the secondary shoe must overcome not only the spring load but also the friction of the flexible cable over the anchor pin. The assembly of the mechanism embodying the invention is accomplished more easily than the assembly of separate retracting springs, with a consequent reduction in cost. The wear on the flexible cable as it runs over the anchor pin is negligible since the cable moves in relation to the anchor pin only when the brakes are applied in reverse.

Figure 2:
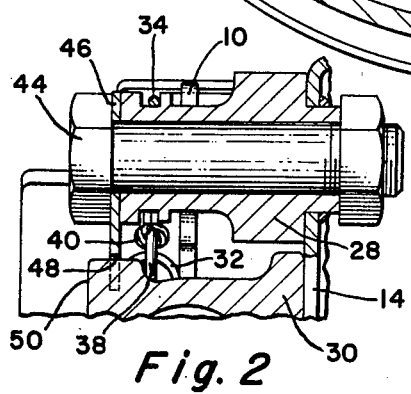

In the drawing:
FIGURE 1 is a cross-section view of a brake mechanism embodying the invention.
FIGURE 2 is a fragmentary section view of the anchor pin construction of the mechanism of FIGURE 1 taken in the direction of arrows 2—2 of that figure.

The brake mechanism of the drawing is of the usual duo-servo type wherein the primary shoe 10 and the secondary shoe 12 are resiliently mounted on the backing plate 14 by the hold-down spring assemblies 16 and 18. The lower ends of the shoes are joined by a shoe adjuster 20 which may be actuated by the shoe adjuster mechanism 22 for automatic brake adjustment. Mechanism 22 includes the adjuster actuating lever link 24. Shoes 10 and 12 are frictionally engageable with the drum 26 which is rotatable with the wheel and also are engageable, when in the released position, with the anchor pin 28, which is also secured to the backing plate. Actuation of the shoes is provided by the wheel cylinder 30 in the usual manner.

The retracting mechanism which is a feature of the invention includes the retractor spring 32 and the flexible cable 34. Spring 32 preferably has one end 36 secured to the web of the primary shoe 10 and the other spring end 38 secured to the end 40 of the flexible cable. Flexible cable 34 then passes over the anchor pin 28 in sliding relation thereto and has its other end 42 secured to the web of secondary shoe 12. Anchor pin 28 is secured to the backing plate by means of the anchor bolt 44 which extends through the pin 28. An anchor bolt lock plate 46 holds the bolt against rotation with a washer action and may be provided with a cleft 48 which fits over the boss 50 formed on the wheel cylinder 30. A hooked tab 52 formed from plate 46 provides the attaching means for the adjuster actuating lever link 24.

When the brake mechanism is actuated by pressurizing the wheel cylinder 30, during a forward stop, the primary shoe upper end leaves the anchor pin 28 since the shoe only has to overcome the tensile force of spring 32. The secondary shoe 12 remains engaged with the anchor pin since, in order to move away from the pin, it would have to overcome the tensile force of spring 32 and the frictional force of cable 34 engaging anchor pin 28. Thus in forward stop actuation, cable 34 does not move relative to the anchor pin. Since most vehicle stops are in the forward direction, wear is negligible even although the cable will move relative to the anchor pin when reverse stops are made.

This construction has eliminated the secondary retracting spring and has placed the primary spring 32 adjacent the upper end of the primary shoe, which is one of the coolest portions of the brake assembly during operation since the primary shoe absorbs a relatively small percentage of the braking force and the spring is well away from the secondary shoe.

In the claims:
1. In a brake assembly having a primary shoe and a secondary shoe and an anchor pin engageable by one end of each of said shoes and means for expanding said shoes, a shoe retracting mechanism comprising, a retracting spring secured to one of said shoes at one end and a flexible cable secured to the other of said shoes and passing over the anchor pin and secured to the other end of said spring.

2. The mechanism of claim 1, said retracting spring being secured to said primary shoe.

3. In a brake mechanism having a backing plate and a primary shoe and a secondary shoe and a shoe adjuster joining two adjacent ends of said shoes and mechanism mounted on and actuatable by expanding and retracting movement of one of said shoes for adjusting said adjuster and an anchor pin secured to said backing plate by an anchor bolt and engageable by the other two adjacent ends of said shoes, an anchor bolt locking plate securing said anchor bolt against rotation, an adjuster actuating lever link attached to said locking plate and to said adjusting mechanism, means interconnecting said other two shoe adjacent ends and when energized expanding said shoes and commencing actuation of said adjuster mechanism, a retracting spring secured to one of said shoes at one end, a retracting cable secured to the other of said shoes at one end and passing over said anchor pin and having the other end thereof secured to the other end of said spring, said retracting spring and said retracting cable acting on said shoes upon deenergization of said expanding means to retract said shoes and complete the actuation of said adjusting mechanism.

4. A duo-servo brake shoe retracting mechanism comprising a single retractor spring and an axially flexible fixed length cable member capable of transmitting only tension forces attached in series at adjacent ends thereof and having the opposite ends adapted to be secured to the shoes of a duo-servo brake assembly.

5. A brake mechanism having a primary shoe and a secondary shoe and a backing plate on which said shoes are movably secured and an anchor pin secured to said backing plate, two adjacent ends of said shoes being in engageable relation with said anchor pin, and retracting means for said shoes comprising a single tensile member and a flexible non-tensile fixed length cable member secured in series to said shoes, said flexible non-tensile fixed length cable member passing in bending relation over said anchor pin in slidable engagement therewith.

6. The brake mechanism of claim 5, further comprising shoe expansion means mounted on said backing plate and connected to act on said two adjacent shoe ends, said flexible non-tensile fixed length cable member having frictional resistance to slidable movement on said anchor pin causing said tensile member to yield and permit the shoe directly secured to said tensile member to expand before the shoe directly connected to said flexible non-tensile fixed length cable member expands under actuation of said shoe expansion means.

7. A brake shoe retracting mechanism for a pair of brake shoes comprising, a single retractor spring, an axially flexible cable capable of transmitting only tension forces and adapted to flexibly bend around and slide on a cable support and guide member, said cable being attached in series with said spring at adjacent ends thereof, the opposite ends of said spring and said cable being adapted to be secured to said shoes.

References Cited by the Examiner

UNITED STATES PATENTS

| | | | |
|---|---|---|---|
| 2,166,157 | 7/39 | Jones | 188—78 |
| 2,411,639 | 11/46 | Sawtelle | 188—152 |
| 2,493,177 | 1/50 | Williams | 188—79.5 |

EUGENE G. BOTZ, *Primary Examiner.*

RALPH D. BLAKESLEE, *Examiner.*